US010540325B2

(12) United States Patent
Jiao et al.

(10) Patent No.: US 10,540,325 B2
(45) Date of Patent: Jan. 21, 2020

(54) METHOD AND DEVICE FOR IDENTIFYING JUNK PICTURE FILES

(71) Applicant: Beijing Kingsoft Internet Security Software Co., Ltd., Beijing (CN)

(72) Inventors: Guoqiang Jiao, Beijing (CN); Qidong Yang, Beijing (CN); Xiliang Bai, Beijing (CN); Xueshi Du, Beijing (CN); Nan Zhang, Beijing (CN); Yong Chen, Beijing (CN)

(73) Assignee: Beijing Kingsoft Internet Security Software Co., Ltd., Beijing (CN)

( * ) Notice: Subject to any disclaimer, the term of this patent is extended or adjusted under 35 U.S.C. 154(b) by 503 days.

(21) Appl. No.: 15/321,412

(22) PCT Filed: Jun. 23, 2015

(86) PCT No.: PCT/CN2015/082122
§ 371 (c)(1),
(2) Date: Dec. 22, 2016

(87) PCT Pub. No.: WO2015/196981
PCT Pub. Date: Dec. 30, 2015

(65) Prior Publication Data
US 2017/0199889 A1 Jul. 13, 2017

(30) Foreign Application Priority Data
Jun. 27, 2014 (CN) .......................... 2014 1 0302748

(51) Int. Cl.
*G06F 16/172* (2019.01)
*G06F 16/11* (2019.01)
(Continued)

(52) U.S. Cl.
CPC .......... *G06F 16/172* (2019.01); *G06F 16/125* (2019.01); *G06F 16/162* (2019.01); *G06F 16/183* (2019.01)

(58) Field of Classification Search
CPC .. G06F 16/172; G06F 16/9574; G06F 16/162; G06F 16/125; G06F 16/183
(Continued)

(56) References Cited

U.S. PATENT DOCUMENTS 7,096,418 B1* 8/2006 Singhal ............... G06F 16/9574
715/205
2014/0365451 A1* 12/2014 Chen ..................... G06F 16/162
707/692

FOREIGN PATENT DOCUMENTS

CN 101311934 A 11/2008
CN 102567319 A 7/2012
(Continued)

OTHER PUBLICATIONS

PCT/CN2015/082122, Sep. 22, 2015, International Search Report.
International Search Report for Application No. PCT/CN2015/082122 dated Sep. 22, 2015.

Primary Examiner — Evan Aspinwall
(74) Attorney, Agent, or Firm — Wolf, Greenfield & Sacks, P.C.

(57) ABSTRACT

A method and device for identifying junk picture files, which are used for a server side to identify junk picture files in cached network data. The method comprises: obtaining a directory to be detected; determining whether the number of files in the directory is greater than or equal to a first preset value; if so, determining whether file names of the files in the directory contain keywords which represent the cached network data; if the keywords are contained, determining that the files in the directory are the cached network data, and then, determining whether keywords which represent (Continued)

useless picture files exist in the cached network data, so as to find out whether junk picture files exist; if the junk picture files exist, identifying the found picture files as cached junk picture files; and recording a directory path where the cached junk picture files are located. By means of the above solution, the cached network junk picture files can be accurately identified.

10 Claims, 3 Drawing Sheets

(51) Int. Cl.
*G06F 16/16* (2019.01)
*G06F 16/182* (2019.01)

(58) Field of Classification Search
USPC .......................................................... 707/827
See application file for complete search history.

(56) References Cited

FOREIGN PATENT DOCUMENTS

| | | | | |
|---|---|---|---|---|
| CN | 102654872 | A | * | 9/2012 |
| CN | 102880713 | A | * | 1/2013 |
| CN | 103365882 | A | | 10/2013 |
| CN | 103530424 | A | | 1/2014 |
| CN | 103677977 | A | | 3/2014 |

* cited by examiner

METHOD AND DEVICE FOR IDENTIFYING JUNK PICTURE FILES

CROSS-REFERENCE TO RELATED APPLICATIONS

This application is the national phase of International Application No. PCT/CN2015/082122, titled "METHOD AND DEVICE FOR IDENTIFYING JUNK PICTURE FILES", filed on Jun. 23, 2015, which claims priority to Chinese Patent Application No. 201410302748.7, entitled "METHOD AND DEVICE FOR IDENTIFYING JUNK PICTURE FILES", filed with the Chinese State Intellectual Property Office on Jun. 27, 2014, which applications are hereby incorporated by reference to the maximum extent allowable by law.

TECHNICAL FIELD

The present application relates to the technical field of identifying of junk files, and in particular, to a method and device for identifying junk picture files.

BACKGROUND ART

With the progress of science and technology and rapid development of communications and other related technologies, mobile devices, such as mobile phones, PAD, etc. have been integrated into people's daily lives and become an indispensable part thereof.

Due to the characteristics of existing software applications, a lot of storage spaces in a mobile device are often occupied by useless data, resulting in an insufficient storage space in a mobile device, thereby affecting the normal application. For example, a lot of network junk files are often cached in a mobile device, when too many junk files are cached, the start of normal application in the mobile device will be affected. However, network junk picture files account for the majority of the cached network junk files, therefore, in order to delete network picture files, it is inevitable to identify the junk pictures first, thereby how to identify the cached junk picture files effectively becomes an urgent problem to be solved.

SUMMARY OF INVENTION

The objective of the embodiments of the present application is to provide a method and device for identifying junk picture files so as to identify cached network junk picture files accurately.

In order to achieve the objective mentioned above, the embodiments of the present application disclose a method for identifying junk picture files, which is applicable to a server side to identify junk picture files in cached network data. The method comprises:

obtaining a directory to be detected;

determining whether the number of files in the directory is greater than or equal to a first preset value, and if so, determining whether file names of the files in the directory contain a keyword that represents the cached network data;

determining that the files in the directory are cached network data if the keyword is contained, and further determining whether a keyword that represents a useless picture file exists in the cached network data so as to find out whether junk picture files exist;

if the junk picture files exist, identifying the found picture files as cached junk picture files; and recording a directory path where the cached junk picture files are located.

Wherein, the step of obtaining a directory to be detected comprises:

running a variety of applications at a server side simulatively;

recording file directories generated by the respective applications after running; and taking all the generated file directories as the directories to be detected.

Wherein, the step of determining whether a keyword that represents a useless picture file exists in the cached network data so as to find out whether junk picture files exist comprises one or any combination of the following steps:

determining whether a word that represents a useless picture exists in a path of the cached network data, and if so, the files, to which the path of the cached network data is directed, are cached junk picture files;

determining whether a separator, which is greater than or equal to a second preset value, exists in the file names in the cached network data, and if so, the files corresponding to the file names are cached junk picture files;

determining whether a string that represents a resolution property exists in the file names in the cached network data, and if so, the files corresponding to the file names are cached junk picture files.

Wherein, the word that represents a picture are NEWS and IMAGE; the separator comprises but not limited to "_", "%", "#"; the string that represents a resolution property are XXX*XXX, wherein X represents Arabic numerals.

Wherein the method also comprises:

receiving, from a mobile terminal, a request for deleting junk picture files, wherein the request contains the directory path where the junk picture files are located;

comparing a directory path in the request where the junk picture files are located with a directory path where the locally stored junk picture files are located, and identifying the path in the request, if the comparison result indicates that the two paths are consistent with each other; and sending a response of deleting junk picture files to the mobile terminal, wherein the response contains the path identifier of junk picture files so that the mobile terminal is able to identify the directory of the locally cached junk picture files according to the received response, and perform corresponding processing.

Wherein, the keyword that represents cached network data is "http".

The embodiments of the present application also provide a device for identifying junk picture files, which is applicable to a server side to identify junk picture files in cached network data. The device comprises:

a directory obtaining module for obtaining a directory to be detected;

a first determining module for determining whether the number of files in the directory is greater than or equal to a first preset value, and if so, determining whether file names of the files in the directory contain a keyword that represents the cached network data;

a second determining module for determining that the files in the directory are the cached network data if the files names of the files in the directory contain a keyword that represents the cached network data, and further determining whether a keyword that represents a useless picture file exists in the cached network data so as to find out whether junk picture files exist;

a third determining module for identifying the found picture files as cached junk picture files if the keyword that represents a useless picture file exists in the cached network data; and a recording module for recording the path of the cached junk picture files.

Wherein, the directory obtaining module comprises:

a simulation-running sub-module for running a variety of applications at a server side simulatively; and a record sub-module for recording file directories generated by the respective applications after running; and taking all the generated file directories as the directories to be detected.

Wherein, the second determining module comprises one or any combination of:

a path determining sub-module for determining whether a word that represents a useless picture exists in a path of the cached network data, and if so, the files, to which the path of the cached network data is directed, are cached junk picture files;

a separator determining sub-module for determining whether a separator, which is greater than or equal to a second preset value, exists in the file names in the cached network data, and if so, the files corresponding to the file names are cached junk picture files;

a resolution property determining sub-module for determining whether a string that represents a resolution property exists in the file names in the cached network data, and if so, the files corresponding to the file names are cached junk picture files.

Wherein, the device also comprises:

a receiving module for receiving, from a mobile terminal, a request for deleting junk picture files, wherein the request contains the directory path where the junk picture files are located;

a comparison module for comparing the path of the junk picture files in the request with the path of the locally stored junk picture files, and obtaining an identifier of picture files having a same path; and a sending module for sending a response of deleting junk picture files to the mobile terminal, wherein the response contains the path identifier of junk picture files so that the mobile terminal is able to identify the directory of the locally cached junk picture files according to the received response, and perform corresponding processing.

The embodiments of the present application also provide a storage medium for storing an application program, which is used for carrying out a method for identifying junk picture files provided by the embodiments of the present application when running. Wherein, the method for identifying junk picture files provided by the present application is applicable to a server side to identify junk picture files in cached network data. The method comprises:

obtaining a directory to be detected;

determining whether the number of files in the directory is greater than or equal to a first preset value, and if so, determining whether file names of the files in the directory contain a keyword that represents the cached network data;

determining that the files in the directory are cached network data if the keyword is contained, and further determining whether a keyword that represents a useless picture file exists in the cached network data so as to find out whether junk picture files exist;

if the junk picture files exist, identifying the found picture files as cached junk picture files; and recording a directory path where the cached junk picture files are located.

The embodiments of the present application also provide an application program for carrying out a method for identifying junk picture files provided by the embodiments of the present application when running. Wherein, the method for identifying junk picture files provided by the embodiments of the present application is applicable to a server side to identify junk picture files in cached network data. The method comprises:

obtaining a directory to be detected;

determining whether the number of files in the directory is greater than or equal to a first preset value, and if so, determining whether file names of the files in the directory contain a keyword that represents the cached network data;

determining that the files in the directory are cached network data if the keyword is contained, and further determining whether a keyword that represents a useless picture file exists in the cached network data so as to find out whether junk picture files exist;

if the junk picture files exist, identifying the found picture files as cached junk picture files; and recording a directory path where the cached junk picture files are located.

The embodiments of the present application also provide an electronic device, which comprises:

a processor, a memory, communication interfaces and a bus;

the processor, the memory and the communication interfaces are connected and communicate via the bus with each other;

the memory stores executable program codes;

the processor carries out a program corresponding to the executable program codes by reading the executable program codes stored in the memory for performing the following steps:

obtaining a directory to be detected;

determining whether the number of files in the directory is greater than or equal to a first preset value, and if so, determining whether file names of the files in the directory contain a keyword that represents the cached network data;

determining that the files in the directory are cached network data if the keyword is contained, and further determining whether a keyword that represents a useless picture file exists in the cached network data so as to find out whether junk picture files exist;

if the junk picture files exist, identifying the found picture files as cached junk picture files; and recording a directory path where the cached junk picture files are located.

From the technical solution mentioned above, it can be seen that in the embodiments of the present application, all the directories generated during the running of various applications are detected, directories of the junk picture files in the cached network data are identified and the directory paths, where the cached junk picture files are located, are recorded so as to identify the cached network junk picture files accurately.

Furthermore, using the directory paths, where the junk picture files in cached network data recorded in a network side are located, may help a mobile terminal to determine the junk picture files locally stored and position the junk picture files quickly, thereby improving the cleaning efficiency of junk files.

Of course, any product or method implementing the present application does not necessarily achieve simultaneously all the advantages mentioned above.

BRIEF DESCRIPTION OF DRAWINGS

In order to describe the technical solution of the embodiments of the present application and the prior art more clearly, a brief description with reference to the accompanying drawings required for the embodiments and the prior art will be given below, it is obvious that the drawings of the following description are some embodiments of the present application, and other drawings can be obtained by those ordinary skilled in the art in accordance with these accompanying drawings without any inventive efforts.

DETAILED DESCRIPTION OF EMBODIMENTS

In order to describe the objectives, the technical solution and the advantages of the present application more clearly and understandable, the present application will be described further in detail below with reference to the accompanying drawings and the illustrative embodiments. It is obvious that the described embodiments are a part of embodiments of the present application, but not all of them. Based on the embodiments of the present application, all of the other embodiments obtained by those ordinary skilled in the art without any inventive efforts are within the protection scope of the present application.

Figure 1:
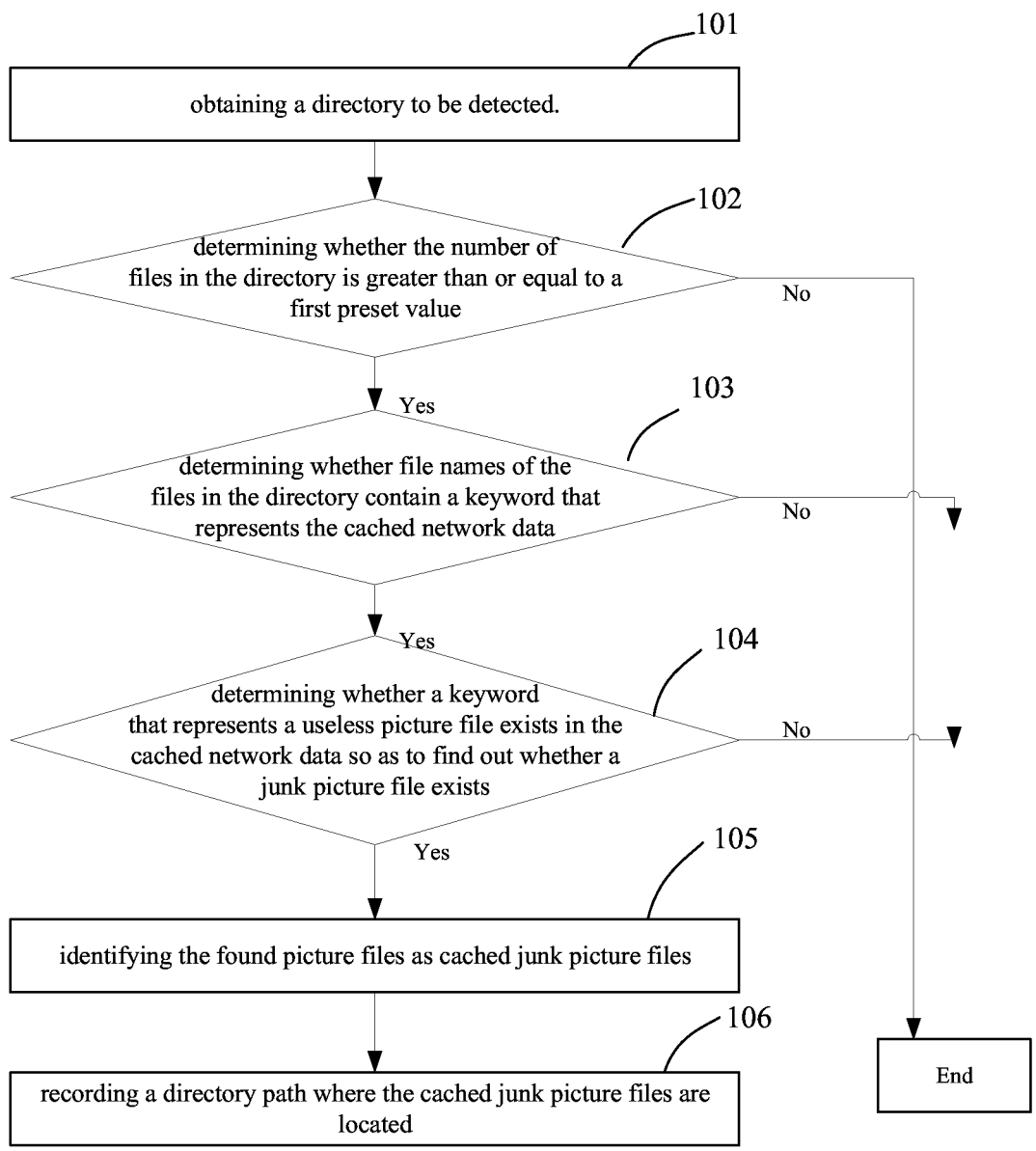
FIG. 1 is a flowchart of a method for identifying junk picture files in accordance with embodiments of the present application.

Referring to FIG. 1, which shows a flowchart of a method for identifying junk picture files in accordance with an embodiment of the present application, which is applicable to a server side to identify junk picture files in cached network data. The method specifically comprises the following steps.

In step 101, a directory to be detected is obtained.

Here, one possible step of obtaining a directory to be detected comprises:

A) running a variety of applications at a server side simulatively. For example, simulation-running various office software such as word application, PDF application, image processing tools, dictionaries, etc., simulation-running various chat tools such as QQ, Fetion, WangWang, etc., or simulation-running various game applications; the applications per se. are not limited in the present embodiment and any executable application is applicable to the present application.

B) recording the directory paths generated by various applications after running;

It is understandable that most applications will generate directories of files related to the applications themselves after running, here, all the generated files are recorded;

C) determining all the directories of the files as the directories to be detected.

In this way, it can be ensured that no directories will be missed during detection.

In step 102, it is determined whether the number of files in the directory is greater than or equal to a first preset value, and if so, performing step 103, otherwise the process ends.

It is understandable that if the number of files in the directory is too small, it is highly possible to lead to inaccurate random judgment, thereby it is required that the number of files in the directory is greater than or equal to a first preset value, the first preset value is an integer, e.g. it may be 8, 10, etc., specific values may be determined according to practical needs.

In step 103, it is determined whether file names of the files in the directory contain a keyword that represents the cached network data; if so, performing step 104, otherwise the process ends.

Here, the keywords could be any words, as long as they can represent cached network data, the present application does not limit the expression forms of the keywords, for example, the above keywords representing cached network data may be "http", certainly, in practical applications, the letters of the keyword "http" are not limited to be lowercase or uppercase, that is to say, all letters of "http" may be lowercase or uppercase, or a part of letters of the keyword are lowercase while the others are uppercase, e.g. Http, htTP, and so on.

In step 104, after determining that the files in the directory are the cached network data, further determining whether a keyword that represents a useless picture file exists in the cached network data so as to find out whether a junk picture file exists; and if so, performing step 105, otherwise the process ends.

Specifically, the step of determining whether a keyword that represents a useless picture file exists in the cached network data so as to find out whether a junk picture file exists may comprise one or any combination of the three following ways.

The first way: determining whether a word that represents a useless picture exists in a path of the cached network data, and if so, the files, to which the path of the cached network data is directed, are cached junk picture files;

Specifically, the words representing useless pictures are NEWS and IMAGE, for example, NEWS and IMAGE appearing sequentially or simultaneously in paths. Certainly, any words, as long as they can represent pictures, are applicable to the present application. The present application does not limit the specific expression forms of the words. Furthermore, in the practical applications, the letters of the NEWS and IMAGE are not limited to be uppercase or lowercase, that is to say, all letters of NEWS and IMAGE can be lowercase or uppercase, or a part of letters of the keywords are lowercase while the others thereof are uppercase, e.g. news, Image, and so on.

The second way: determining whether a separator, which is greater than or equal to a second preset value, exists in the file names in the cached network data, and if so, the files corresponding to the file names are cached junk picture files.

Here, the separator includes but not limited to "_", "%", "#", any possible separator is applicable to the present application.

The second preset value mentioned above is an integer, it may be 5, 6, etc., the specific values may be determined according to practical needs. Furthermore, the second preset value may be identical to the first preset value, or may also be different with the first preset value.

The third way: determining whether a string that represents a resolution property exists in the file names in the cached network data, and if so, the files corresponding to the file names are cached junk picture files.

The strings representing resolution property mentioned above are XXX*XXX, wherein X represents Arabic numerals, for example, it may be 120*120 and so on.

In step 105, identifying the found picture files as cached junk picture files;

In step 106, recording a directory path where the cached junk picture files are located.

Therefore, by applying the method provided by the embodiments of the present application, the directory of the junk picture files in the cached network data is identified, and the directory paths, where the cached junk picture files are located, are recorded, and thereby identifying accurately the cached junk picture files.

It is understandable that the procedure shown in FIG. 1 is described by an example of a directory detection process. In the practical applications, it is required to detect every directory in sequence, so as to obtain all directories of the cached network junk picture files.

Figure 2:
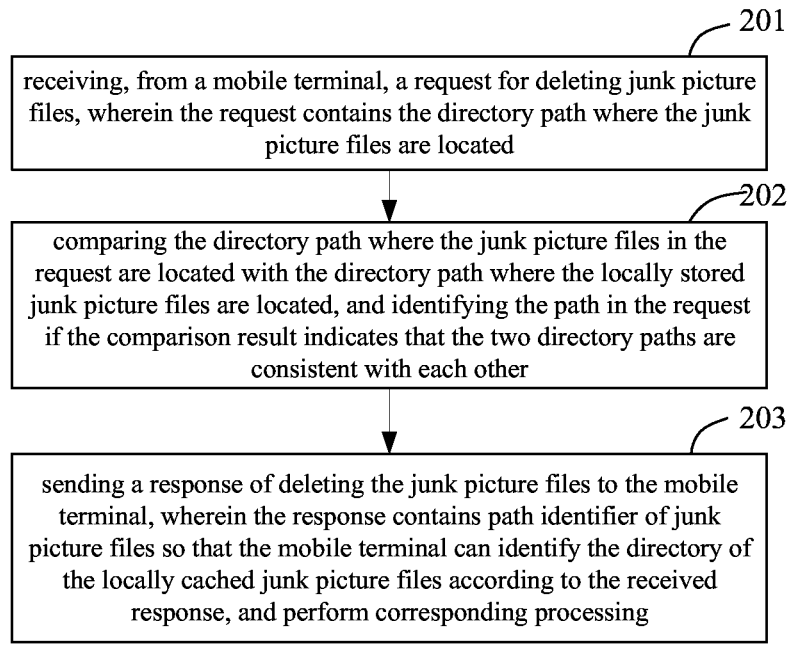
FIG. 2 is a flowchart of a method for assisting a mobile terminal to identify junk picture files based on the embodiment shown in FIG. 1.

It is noted that based on the embodiment shown in FIG. 1, it is possible to use the directory paths, where the junk picture files cached in a server are located, to assist a mobile terminal to identify junk picture files, as shown in FIG. 2 specifically.

In step 201, receiving, from a mobile terminal, a request for deleting junk picture files, wherein the request contains the directory path where the junk picture files are located.

In step 202, comparing the directory path where the junk picture files in the request are located with the directory path where the locally stored junk picture files are located, and identifying the path in the request if the comparison result indicates that the two directory paths are consistent with each other.

In step 203, sending a response of deleting the junk picture files to the mobile terminal, wherein the response contains path identifier of junk picture files so that the mobile terminal can identify the directory of the locally cached junk picture files according to the received response, and perform corresponding processing.

Here, the path identifier of the junk picture files may be the path itself, or may be a special identifier. The present application does not limit the specific expression forms of the path identifier of the junk picture files, and any possible form is applicable to the present application.

After the mobile terminal identifies the directory where the locally cached junk picture files are located according to the received response, it can perform corresponding processing according to the strategies thereof, for example, delete directly, or send a prompt information for deleting junk picture files to users, and perform a deletion operation after receiving a acknowledgment feedback from users, or mark the directory paths of the junk picture files, and perform centralized processing after arriving at a predetermined time.

It can be seen that using the directory paths, where the junk picture files in the cached network data recorded at a network side are located, can help a mobile terminal to determine the junk picture files stored locally and position the junk picture files quickly, thereby improving the cleaning efficiency of junk files.

Figure 3:
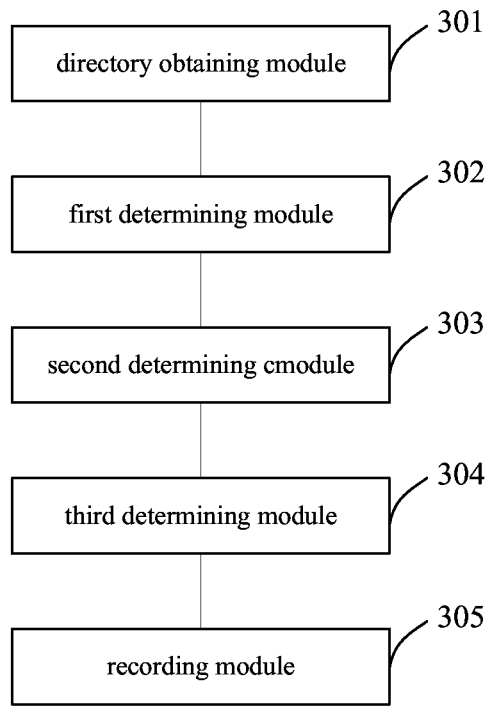
FIG. 3 is a schematic logical structural diagram of a device for identifying junk picture files provided by the embodiments of the present application.

The embodiments of the present application also provide a device for identifying junk picture files, which is applicable to a server side to identify junk picture files in cached network data. Referring to FIG. 3, the device comprises:

a directory obtaining module 301 for obtaining a directory to be detected;

a first determining module 301 for determining whether the number of files in the directory is greater than or equal to a first preset value, and if the number of the files in the directory is greater than or equal to the first preset value, determining whether file names of the files in the directory contain a keyword that represents cached network data;

a second determining module 303 for determining that the files in the directory are the cached network data if the files names of the files in the directory contain a keyword that represents cached network data, and determining whether a keyword that represents useless picture file exists in the cached network data so as to find out whether junk picture files exist;

a third determining module 304 for identifying the found picture files as cached junk picture files if a keyword that represents useless picture file exists in the cached network data; and a recording module 305 for recording the path of the cached junk picture files.

The above directory obtaining module 301 may comprise specifically:

a simulation-running sub-module (not shown in the figures) for running a variety of applications at a server side simulatively; and a record sub-module (not shown in the figures) for recording the directories of the files generated by the respective applications after running; and determining all the generated directories of the files as the directories to be detected.

The above second determining module 303 comprises one or any combination of:

a path determining sub-module (not shown in the figures) for determining whether a word that represents a useless picture exists in a path of the cached network data, and if so, the files, to which the path of the cached network data is directed, are cached junk picture files;

a separator determining sub-module (not shown in the figures) for determining whether a separator, which is greater than or equal to a second preset value, exists in the file names in the cached network data, and if so, the files corresponding to the file names are cached junk picture files; and a resolution property determining sub-module (not shown in the figures) for determining whether a string that represents resolution property exists in the file names in the cached network data, and if so, the files corresponding to the file names are cached junk picture files.

By applying the device provided by the embodiments of the present application, the directories of the junk picture files in the cached network data are identified, and the directory paths, where the cached junk picture files are located, are recorded, and thereby identifying accurately the cached junk picture files.

Figure 4:
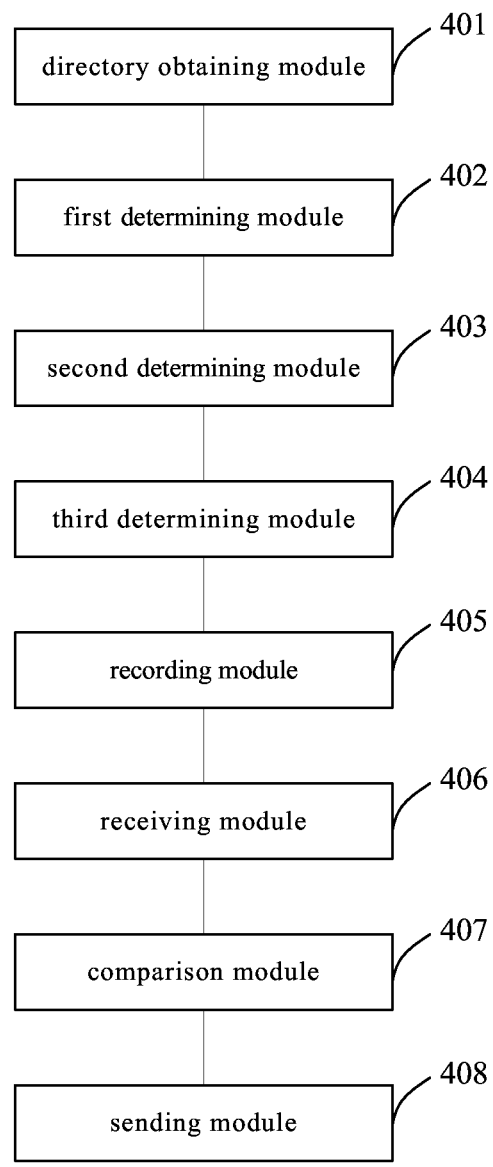
FIG. 4 is a schematic logical structural diagram of a device for identifying junk picture files by a mobile terminal based on the embodiment shown in FIG. 1.

Based on the embodiment shown in FIG. 3, it is possible to use the directory paths, where the junk picture files cached in a server, to assist a mobile terminal to identify junk files. Referring to FIG. 4, based on the device shown in FIG. 3, the device may further comprise:

a receiving module 406 for receiving, from a mobile terminal, a request for deleting junk picture files, wherein the request contains the path of the junk picture files;

a comparison module 407 for comparing the path of the junk picture files in the request with the path of the locally stored junk picture files, and obtaining an identifier of picture files having a same path; and a sending module 408 for sending a response of deleting junk picture files to the mobile terminal, wherein the response contains the identifier of the junk picture files so that the mobile terminal can identify the locally cached junk picture files according to the received response, and perform corresponding processing.

The modules 401 to 405 in FIG. 4 are identical to the modules 301 to 305 in the embodiments shown in FIG. 3, thereby no detailed description is made hereto.

It can be seen that using the directory paths, where the junk picture files in the cached network data recorded at a network side are located, may help the mobile terminal to determine the junk picture files stored locally and position the junk picture files quickly, thereby improving the cleaning efficiency of junk files.

The embodiments of the present application also provide a storage medium for storing application programs, which are used for performing the method for identifying junk picture files provided by the embodiments of the present application when operated. The method for identifying junk picture files provided by the present application is applicable to a server side to identify junk picture files in cached network data. The method comprises:

obtaining a directory to be detected;

determining whether the number of files in the directory is greater than or equal to a first preset value, and if so, determining whether file names of the files in the directory contain a keyword that represents the cached network data;

determining that the files in the directory are cached network data if the keyword is contained, and further determining whether a keyword that represents a useless picture file exists in the cached network data so as to find out whether junk picture files exist;

if the junk picture files exist, identifying the found picture files as cached junk picture files; and recording a directory path where the cached junk picture files are located.

The embodiments of the present application also provide an application program, for carrying out a method for identifying junk picture files provided by the embodiments of the present application when running. Wherein, the method for identifying junk picture files provided by the embodiments of the present application is applicable to a server side to identify junk picture files in cached network data. The method comprises:

obtaining a directory to be detected;

determining whether the number of files in the directory is greater than or equal to a first preset value, and if so, determining whether file names of the files in the directory contain a keyword that represents the cached network data;

determining that the files in the directory are cached network data if the keyword is contained, and further determining whether a keyword that represents a useless picture file exists in the cached network data so as to find out whether junk picture files exist;

if the junk picture files exist, identifying the found picture files as cached junk picture files; and recording a directory path where the cached junk picture files are located.

The embodiments of the present application also provide an electronic device, which comprises:

a processor, a memory, communication interfaces and a bus;

the processor, the memory and the communication interfaces are connected and communicated with each other via the bus;

the memory stores executable program codes;

the processor runs a program corresponding to the executable program codes by reading the executable program codes stored in the memory for performing the following steps:

obtaining a directory to be detected;

determining whether the number of files in the directory is greater than or equal to a first preset value, and if so, determining whether file names of the files in the directory contain a keyword that represents the cached network data;

determining that the files in the directory are cached network data if the keyword is contained, and further determining whether a keyword that represents a useless picture file exists in the cached network data so as to find out whether junk picture files exist;

if the junk picture files exist, identifying the found picture files as cached junk picture files; and recording a directory path where the cached junk picture files are located.

For embodiments of the device, since they are substantially similar to the embodiments of the method, the description thereof is relatively simple and reference can be made to part of the description of the embodiments of the method for the relevant parts.

For convenience of description, the above device is described based on being divided into various units according to the functions thereof respectively. Certainly, when implementing the present application, it is possible that the functions of various units are implemented in a same or a plurality of software and/or hardwires.

According to the above description of the embodiments, it can be known that those skilled in the art may clearly understand that the present application can be achieved by using software combining required general hardware platform. Based on this understanding, the technical solution of the present application can essentially or a part thereof, which contributes to the prior art, may be embodied in the form of a software product. The computer software product may be stored in a storage medium, such as a ROM/RAM, a magnetic disc, an optical disc and so on, which includes a series of instructions to instruct a computer device (maybe a personal computer, a server, or a network device, etc.) to implement the method provided by every embodiment or some parts of the embodiments of the present application.

It is noted that in the present application, relational terms such as first, second, etc. are merely used to distinguish one entity or operation from another entity or operation, without necessarily requiring or implying any actual relation or order between such entities or operations. Furthermore, terms "comprise", "contain" or any other variations thereof are intended to cover a non-exclusive inclusion, such that the process, the method, the article or the apparatus comprising a series of factors comprise not only those factors, but also other factors being not listed explicitly, or further comprise the factors included inherently in the process, the method, the article or the apparatus. Without more constraints, the factors defined by the statement of "including a . . . " does not exclude the existence of other same factors in the process, the method, the article or the apparatus comprising said factors.

The present application is applicable to numerous general purpose or special purpose computing system environments or configurations. For example: a personal computer, a server computer, a handheld or laptop device, a tablet-type device, a multiprocessor system, a microprocessor-based system, a set-top box, a programmable consumer electronic device, a network PC, a minicomputer, a mainframe computer, a distributed computing environment including any of the above systems or devices, and so on.

The above embodiments are only the preferred ones of the present application, and not intended to limit the protection scope of the present application. Any modifications, equivalent alterations and improvements made within the spirit and the principle of the present application fall into the protection scope of the present application.

What is claimed is:

1. A method for identifying junk picture files, which is applicable to a server side to identify junk picture files in cached network data, characterized in that the method comprises:

simulating the execution of a client application at a server side;

recording file directories generated by the respective applications after running;

taking all the generated file directories as the directories to be detected;

determining whether the number of files in the directory is greater than or equal to a first preset value, and if so, determining whether file names of the files in the directory contain a keyword that represents the cached network data;

determining that the files in the directory are cached network data if the keyword is contained, and further determining whether a keyword that represents a useless picture file exists in the cached network data so as to find out whether junk picture files exist;

if the junk picture files exist, identifying the found picture files as cached junk picture files; and recording a directory path where the cached junk picture files are located.

2. The method according to claim 1, characterized in that the step of determining whether a keyword that represents a useless picture file exists in the cached network data so as to find out whether junk picture files exist comprises one or any combination of the following steps:

determining whether a word that represents a useless picture exists in a path of the cached network data, and if so, the files, to which the path of the cached network data is directed, are cached junk picture files;

determining whether separators, the number of which is greater than or equal to a second preset value, exist in the file names in the cached network data, and if so, the files corresponding to the file names are cached junk picture files;

determining whether a string that represents a resolution property exists in the file names in the cached network data, and if so, the files corresponding to the file names are cached junk picture files.

3. The method according to claim 2,
characterized in that, the word that represents a picture are NEWS and IMAGE;
the separator comprises "_", "%", "#";
the string that represents a resolution property are XXX*XXX, wherein X represents Arabic numerals.

4. The method according to claim 1, characterized in that the method further comprises:

receiving, from a mobile terminal, a request for deleting junk picture files, wherein the request contains the directory path where the junk picture files are located;

comparing a directory path in the request where the junk picture files are located with a directory path where the locally stored junk picture files are located, and identifying the path in the request, if the comparison result indicates that the two paths are consistent with each other; and sending a response of deleting junk picture files to the mobile terminal, wherein the response contains the path identifier of junk picture files so that the mobile terminal is able to identify the directory of the locally cached junk picture files according to the received response, and delete junk picture files.

5. The method according to claim 1, characterized in that the keyword that represents cached network data is "http".

6. An electronic device for identifying junk picture files, which is applicable to a server side to identify junk picture files in cached network data, characterized in that the electronic device comprises: a processor, a memory, communication interfaces and a bus;

the processor, the memory and the communication interfaces are connected and communicated with each other via the bus;

the memory stores executable program codes;

the processor runs a program corresponding to the executable program codes by reading the executable program codes stored in the memory for performing the following steps:

simulating the execution of a client application at a server side;

recording file directories generated by the respective applications after running;

taking all the generated file directories as the directories to be detected;

determining whether the number of files in the directory is greater than or equal to a first preset value, and if so, determining whether file names of the files in the directory contain a keyword that represents the cached network data;

determining that the files in the directory are the cached network data if the files names of the files in the directory contain a keyword that represents the cached network data, and further determining whether a keyword that represents a useless picture file exists in the cached network data so as to find out whether junk picture files exist;

identifying the found picture files as cached junk picture files if the keyword that represents a useless picture file exists in the cached network data; and recording the path of the cached junk picture files.

7. The electronic device according to claim 6, characterized in that the step of determining whether a keyword that represents a useless picture file exists in the cached network data so as to find out whether junk picture files exist comprises one or any combination of the following steps:

determining whether a word that represents a useless picture exists in a path of the cached network data, and if so, the files, to which the path of the cached network data is directed, are cached junk picture files;

determining whether separators, the number of which is greater than or equal to a second preset value, exist in the file names in the cached network data, and if so, the files corresponding to the file names are cached junk picture files;

determining whether a string that represents a resolution property exists in the file names in the cached network data, and if so, the files corresponding to the file names are cached junk picture files.

8. The electronic device according to claims 6, characterized in that the processor further performing the following steps:

receiving, from a mobile terminal, a request for deleting junk picture files, wherein the request contains the directory path where the junk picture files are located;

comparing the path of the junk picture files in the request with the path of the locally stored junk picture files, and obtaining an identifier of picture files having a same path; and sending a response of deleting junk picture files to the mobile terminal, wherein the response contains the path identifier of junk picture files so that the mobile terminal is able to identify the directory of the locally cached junk picture files according to the received response, and delete junk picture files.

9. The electronic device according to claims 7, characterized in that the word that represents a picture are NEWS and IMAGE;
  the separator comprises "_", "%", "#";
  the string that represents a resolution property are XXX*XXX, wherein X represents Arabic numerals.

10. The electronic device according to claims 6, characterized in that the keyword that represents cached network data is "http".

* * * * *